United States Patent Office 3,644,544
Patented Feb. 22, 1972

3,644,544
PROCESS FOR THE PRODUCTION OF IODOPENTAFLUOROETHANE
Italo Cammarata, Bollate, Milan, and Martino Vecchio, Milan, Italy, assignors to Montecatini Edison S.p.A., Milan, Italy
No Drawing. Continuation-in-part of application Ser. No. 675,761, Oct. 17, 1967. This application Nov. 4, 1968, Ser. No. 775,956
Claims priority, application Italy, Nov. 16, 1967, 22,759/67
The portion of the term of the patent subsequent to Aug. 4, 1987, has been disclaimed
Int. Cl. C07c 17/20, 17/02
U.S. Cl. 260—653.7
10 Claims

ABSTRACT OF THE DISCLOSURE

A process for the production of iodopentafluoroethane ($C_2F_5I$) wherein tetrafluoroethylene ($C_2F_4$) is reacted with molecular iodine ($I_2$) to yield di-iodopentafluoroethane ($C_2F_4I_2$). The latter is reacted in an autoclave with lead dioxide ($PbO_2$) and hydrogen fluoride (HF) at a temperature of 25° to 200° C. (preferably 80° C. to 160°) at a pressure of 5 to 50 atmospheres absolute (ata.), preferably 25–36 ata. The molar ratio $HF/C_2F_4I_2$ is 2 to 50 (preferably 10 to 30). The molar ratio $PbO_2/C_2F_4I_2$ is 0.5 to 2 (preferably 0.5 to 1).

---

This application is a continuation-in-part of our application Ser. No. 675,761, filed Oct. 17, 1967, now Pat. No. 3,523,140, granted Aug. 4, 1970.

The present invention relates to a process for the production of iodopentafluoroethane.

In the above-identified commonly assigned copending application, we have pointed out that iodofluorocarbons and especially iodopentafluoroethane are useful as telogens in telomerization reactions for the production of open-chain polymers of low molecular weight, such polymers being generally describable as "telomers." Iodopentafluoroethane, for example, may be reacted with olefins and fluorolefins to yield alkyliodides or fluoroalkyl iodides of greater molecular weight. Iodopentafluoroethane may also be reacted with metals to produce compounds useful as polymerization initiators.

Prior-art systems for the preparation of iodopentafluoroethane make use of the reaction of tetrafluoroethane with iodopentafluoride alone or in the presence of molecular iodine ($I_2$) and often in the presence of catalysts based upon metallic aluminum, magnesium, thorium, beryllium or strontium or on halides of antimony, tin, etc. Still other processes have been based upon the reaction between fluoroalkyl compounds of mercury and molecular iodine under the action of ultraviolet light and of heat, on the reaction between hydrogen fluoride (HF), molecular iodine ($I_2$) and tetrafluoroethylene ($C_2F_4$) in the presence of mercuric oxide (HgO), and on the reaction between tetrafluoroethylene and molecular iodine in the presence of metal fluorides.

Such earlier processes, however, are characterized by disadvantages which have made the widespread application of the processes impractical or not fully satisfactory. One of the disadvantages of the processes using iodopentafluoride is that the preparation and use of this compound is dangerous and the compound itself relatively expensive because the starting material for its preparation is fluorine, the use of which involves problems of corrosion in the process apparatus.

A disadvantage of those earlier processes making use of fluoroalkyl mercury compounds is that the latter are highly poisonous and volatile; the same disadvantage arises in processes in which tetrafluoroethylene is reacted with molecular iodine and hydrogen fluoride in the presence of HgO, since in these latter processes fluoroalkyl mercury compounds have a tendency to form as the products of secondary reactions or as intermediates of the principal reaction. A further disadvantage is that HgO is an expensive ingredient. Also, processes in which HgO and $I_2$ are used give rise to $HgI_2$ as a byproduct, the recovery of which is necessitated by its high cost. The regeneration of HgO and $I_2$ from the byproduct $HgI_2$ then is effected by what has to date a particularly uneconomic process.

It is the principal object of the present invention to provide a process for the production of iodopentafluoroethane which is free from the disadvantages discussed above and allows the process to be carried out safely and economically.

Another object of this invention is to provide an improved process for the production of iodopentafluoroethane which is economical, uses starting materials of relatively low cost, is efficient, does not give rise to byproducts necessitating expensive and complex regeneration steps and which is easily performed.

Still another object of our invention is the provision of a process for the production of iodopentafluoroethane which extends and simplifies the principles and process described in our application Ser. No. 675,761 mentioned earlier.

Yet another object of the instant invention is to provide a process capable of producing iodopentafluoroethane of considerable purity and high yield.

According to the invention described in said copending application, iodopentafluoroethane is obtained by reacting hydrogen fluoride (HF), lead dioxide ($PbO_2$) and molecular iodine ($I_2$) with tetrafluoroethylene ($C_2F_4$) at a temperature between 0° C. (usually 25° C.) and 200° C., at a pressure between 5 and 50 atmospheres absolute (ata.) and with a molar ratio of hydrogen fluoride to tetrafluoroethylene $HF/C_2F_4=2$ to 25, a molar ratio of lead dioxide to tetrafluoroethylene $PbO_2/C_2F_4$ of 0.1 to 2, and a molar ratio of molecular iodine to tetrafluoroethylene $I_2/C_2F_4$ between 0.1 and 2.

We have now found that it is possible to further simplify the reaction by comparison with the system described in our application Ser. No. 675,761 by using as a starting product the compound $C_2F_4I_2$ obtained by the additional reaction of tertafluoroethylene and molecular iodine. This compound, referred to as di-iodotetrafluoroethane, may be reacted with hydrogen fluoride and lead dioxide in accordance with the simplified reaction scheme

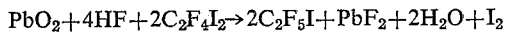
$$PbO_2 + 4HF + 2C_2F_4I_2 \rightarrow 2C_2F_5I + PbF_2 + 2H_2O + I_2$$

According to our invention, therefore, iodopentafluoroethane is obtained by reacting hydrogen fluoride (HF), lead dioxide ($PbO_2$) and di-iodotetrafluoroethane ($C_2F_4I_2$) to temperatures ranging between 25° C. and 200° C. at pressures of 5 to 50 ata. The molar ratio of hydrogen fluoride to di-iodotetrafluoroethane

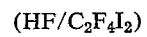
$$(HF/C_2F_4I_2)$$

in accordance with this aspect of the invention, is 2 to 50 while the molar ratio of lead dioxide to di-iodotetrafluoroethane ($PbO_2/C_2F_4I_2$) is 0.5 to 2.

Preferably, the lead dioxide is charged into the autoclave and air present therein is removed by evacuation and/or flushing with nitrogen. The di-iodotetrafluoroethane ($C_2F_4I_2$) and anhydrous hydrogen fluoride in the liquid state are introduced in succession while the contents of the autoclave is agitated to a temperature between 80° C. and 160° C. and is held constant at this temperature for a period ranging from 15 minutes to 6 hours. Incidentally, this reaction time also pertains to the previously described system wherein tetrafluoroethylene and molecular iodine are used. The pressure within the autoclave during the reaction is found to be between 5 and 40 ata. At the conclusion of the reaction the autoclave is cooled to a relatively low temperature level of about 50° C. and then discharged. As in the preceding system, the effluent gases are washed, preferably with water and the aforementioned alkaline solution, are dried and are then condensed in a vessel at —20° C. The condensed fraction consists of iodopentafluoroethane in an amount in excess of 99 mole percent of the total products recovered while the noncondensable gases are the same as those described earlier. The solid $PbF_2$ can be discarded or regenerated and any excess $I_2$ can be recovered and recycled. The recovery of iodine can be effected by sublimation of the solid residue or directly by reaction with $C_2F_4$ so that the iodine of the residue is converted into di-iodotetrafluoroethane in accordance with the addition reaction scheme

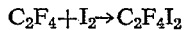

The product of this reaction can then be used in the iodopentafluoroethane reaction.

According to a more specific feature of this invention, the reactants are charged into an autoclave together with tetrafluoroethylene and $PbO_2$ in excess so that the iodine freed during the reaction can interact with $C_2F_4$ to yield $C_2F_4I_2$ and thereby contribute this newly formed reactant to the primary system; this sequence continues to complete utilization of the available iodine. The pressure ranges and temperature ranges at which this modified reaction is best carried out, are the same as has been given for the reaction of iodine, tetrafluoroethylene and lead dioxide. Best results are obtained with a molar ratio of hydrogen-fluoride to di-iodotetrafluoroethane of 10 to 30, a molar ratio of lead dioxide to di-iodotetrafluoroethane ($PbO_2/C_2F_4I_2$) of 0.5 to 1.

The following examples illustrate the best mode currently known to us for carrying out the invention in practice:

EXAMPLE I

Into a stainless-steel 250-cc. autoclave, were introduced 45 g. $PbO_2$ (0.188 mole) and 100 g. (0.3939 mole) of finely ground $I_2$ disublimate. The autoclave was then cooled to 0° C.; air was evacuated from the autoclave through a vacuum pump and 140 g. (7 moles) of liquid anhydrous hydrogen fluoride were drawn into the autoclave.

The temperature increased spontaneously to about 5° C.

The autoclave was then immersed in an oil bath and the temperature was gradually increased to a maximum of 125° C. in about 4 hours; the autoclave during the period was kept under constant stirring and the pressure increased to 14.2 ata. Still under stirring, the autoclave was then permitted to cool and, on reaching 0° C., 30 g. (0.30 mole) of $C_2F_4$ were introduced in increments of 3 g. each. Thereupon, while still maintaining stirring, the temperature was raised again to 125° C. in 4 hours and was kept at 125° C. for another 4 hours. The pressure reached 30 ata.

On completion of the heating period, the mass was permitted to cool to 40° C. and the gaseous products were washed with water at room temperature and then with an aqueous solution of NaOH at 20% titer in order to retain the hydrogen fluoride. The washed gases were then passed through a glass trap cooled to —50° C., while the residual fraction passed through, was collected and was analyzed.

The liquid that condensed in the trap weighed 49 g. and showed a content of $C_2F_5I$ of 99.6%; there were found only unidentifiable impurities.

The mixture of uncondensable gases had the following volumetric composition:

| | Percent |
|---|---|
| Air | 8.2 |
| $C_2F_6$ | 6.2 |
| $C_2F_4$ | 79.1 |
| $C_2F_5I$ | 6.5 |

The net yield in $C_2F_5I$ calculated on the converted $C_2F_4$ was 87%. The conversion of the $C_2F_4$ was 60%.

EXAMPLE 2

Into an autoclave with oscillating stirring was introduced an intimate mixture of 48 g. (0.201 mole) of R.P. (reagent purity) $PbO_2$ and 51 g. (0.202 mole) of finely ground $I_2$ disublimate.

Thereupon suction was applied by a mechanical pump and the temperature was brought down to —5° C. and 120 g. (6 moles) of anhydrous hydrofluoric acid were drawn in. The temperature was then rapidly raised to 125° C. and kept at this value for 2 hours while the measured pressure was 14.8 atmospheres.

Thereupon the mixture was permitted to cool spontaneously and the temperature was further lowered to —5° C., whereupon the tetrafluoroethylene was added in increments; at each addition a particularly pronounced pressure increase was observed in the autoclave when it was steady, while the pressure increase was considerably less appreciable when the autoclave was kept in motion. With continued addition of $C_2F_4$, it was necessary to reduce the temperature of the bath down to the value of —10° C. On the whole 30 g. (0.30 mole) of $C_2F_4$ was added. At this point the autoclave was closed and heating was started, bringing in one hour the temperature up to 120° C. and keeping it at this value for 2 hours. The pressure increased to 32 ata. After heating, the mass was permitted to cool to +50° C. and the products were discharged as in Example 1. By condensation, we obtained 37 g. of pure $C_2F_5I$ (equivalent to 0.15 mole), and 3.3 liters of gas almost exclusively constituted by unconverted $C_2F_4$. The net yield in $C_2F_5I$ with respect to the converted $C_2F_4$ was 98%. The conversion of the $C_2F_4$ was 50%.

EXAMPLE 3

71.7 g. (0.3 mole) of $PbO_2$ and 76.15 g. (0.302 mole) of $I_2$ were ground together in a mortar and then put into a drier for 2 hours.

Thereupon the two products were introduced into an autoclave which was immediately subjected to vacuum and immersed into an oil bath at room temperature. Then, under continuous stirring, 120 g. (6 moles) of liquid anhydrous HF were introduced and, immediately thereafter, the temperature was brought up to 128° C.; it was maintained at this value for 6 hours and 45 minutes. Then the mass was allowed to cool down spontaneously overnight under stirring. Thereafter 30 g. (0.03 mole) of $C_2F_4$ was introduced in five separate fractions. The first fraction caused a pressure increase of 7.2 atmospheres, which shortly dropped to 5.0 atm.; the second fraction increased the pressure up to 12 atm., to drop then to 9.5 atm.; the third fraction results in a pressure increase to 14 atm. to drop then to 12.5 atm. The fourth and fifth fractions cause lesser pressure increases stopping at 16 atm. with a temperature of —10° C. Once the addition of $C_2F_4$ was accomplished, the autoclave was heated under constant stirring at 125° C. for 6 hours, thereby attaining a pressure of 34 ata. After this the mass was cooled overnight and the product then discharged in the manner used in the preceding examples. Thus 57 g. (0.232 mole) of $C_2F_5I$ and 950 cc. of unconverted $C_2F_4$ were obtained. The yield in $C_2F_5I$ with respect to the $C_2F_4$ was 90.0%. The conversion of $C_2F_4$ was 77%.

EXAMPLE 4

In a 280 ml. autoclave, a homogeneous mixture of 71.8 g. (0.3 mole) of $PbO_2$ and 75.9 g. (0.3 mole) of iodine bisublimate were combined. The autoclave was then subjected to high vacuum for 20 minutes after which there was introduced by suction 133 g. (6.64 moles) of anhydrous hydrogen fluoride at room temperature.

The autoclave was then put under stirring and, by externally cooling it, 30 g. (0.3 mole) of gaseous $C_2F_4$ were added attaining a pressure of 12 atm.

Thereupon, upon immersion of the autoclave in an oil bath, heating was started, under constant stirring, bringing the temperature in 2 hours to 128° C. and stabilizing it at this value for 5 hours. The internal pressure reached a maximum of 28 atm. and stabilized itself at 26.1 atm. The autoclave was then permitted to cool and was discharged to yield:

| | Mole |
|---|---|
| $C_2F_4$ | 0.070 |
| $C_2F_6$ | 0.010 |
| $C_2F_5I$ (36.9 g.) | 0.150 |

The conversion of the $C_2F_4$ amounted to 76.6%. The net yields of products with respect to the converted $C_2F_4$ were:

| | Percent |
|---|---|
| $C_2F_6$ | 6.7 |
| $C_2F_5I$ | 65.0 |

EXAMPLE 5

74.7 g. (0.313 mole) of $PbO_2$ and 82 g. (0.324 mole) of $I_2$ were mixed by grinding them together, they were then loaded into an autoclave, after which 125 g. (6.26 moles) of hydrogen fluoride were introduced under vacuum. Thereupon, under constant stirring, after an hour, 30 g. (0.3 mole) of gaseous $C_2F_4$ was added. The autoclave was then heated in an oil bath to 160° C. for 6 hours, reaching a pressure of 36.9 ata., after which it was cooled and discharged as described in the preceding examples. Thereby the following products were obtained:

| | Mole |
|---|---|
| $C_2F_6$ | 0.058 |
| $C_2F_4$ | 0.084 |
| $C_2F_5I$ (24.1 g.) | 0.098 |

The conversion of the $C_2F_4$ was 76.9%. The net yields of the products with respect to the converted $C_2F_4$ were:

| | Percent |
|---|---|
| $C_2F_6$ | 26.8 |
| $C_2F_5I$ | 45.4 |

EXAMPLE 6

An autoclave is charged with 0.3 mole (74.7 g.) of $PbO_2$, 0.3 mole (82 g.) of $I_2$ and 7.5 moles (150 g.) of liquid anhydrous HF. The autoclave is then heated for 5 hours at 125° C., whereupon it is cooled down and 0.3 mole (30 g.) of $C_2F_4$ are added.

Then it is heated once again under stirring for 6 hours at 125° C. Once again the mass is brought down again to 30° C. and the gaseous products are discharged obtaining:

0.025 mole of $C_2F_6$
0.045 mole of $C_2F_4$
0.199 mole of $C_2F_5I$ (48.7 g.)
0.001 mole of high boiling products.

Thereafter a further 30 g. of $C_2F_4$ are fed in, following the same procedure and the following gaseous products were then discharged:

0.001 mole of $C_2F_6$
0.064 mole of $C_2F_4$
0.203 mole of $C_2F_5I$ (50 g.)
0.002 mole of high boiling products.

Then, once again 30 g. of $C_2F_4$ was supplied, operating as before and the following products were discharged:

0.198 mole of $C_2F_4$
0.012 mole of $C_2F_5I$ (29.5 g.)
0.060 mole of $C_2F_4I_2$.

The total loss amounted to 10%, while the conversion of the $C_2F_4$ was 66%. The net yields calculated on the converted $C_2F_4$ amounted to:

| | Percent |
|---|---|
| $C_2F_6$ | 4.2 |
| $C_2F_5I$ | 69.6 |
| $C_2F_4I_2$ | 10.7 |

EXAMPLE 7

35.8 g. (0.15 mole) of $PbO_2$ and 30 g. (0.15 mole) of $I_2$ were mixed by grinding and were then fed into an autoclave. Into the latter under vacuum 128 g. (6.4 moles) of anhydrous hydrogen fluoride was charged.

Under stirring, the temperature was then brought up to 80° C. and maintained at this value for 2.5 hours. The autoclave was then permitted to cool and 30.2 g. (0.302 mole) of gaseous $C_2F_4$ was added.

The autoclave was then heated up to 80° C. and maintained at this temperature for 15 hours, thereby reaching a pressure of 23 ata. After this, the autoclave was cooled and emptied. The following products were obtained:

| | Mole |
|---|---|
| $C_2F_5I$ | 0.041 |
| $C_2F_4I_2$ | 0.028 |
| $C_2F_4$ | 0.233 |

The conversion of the $C_2F_4$ amounted to 23.2%. The net yields of the products calculated on the converted $C_2F_4$ were:

| | Percent |
|---|---|
| $C_2F_5I$ | 59.4 |
| $C_2F_4I_2$ | 40.6 |

EXAMPLE 8

Into a 4,500-cc. stainless-steel autoclave, provided with a mechanical anchor-shaped agitator, 250 g. (0.990 mole) of $PbO_2$ (purity≧95%) are charged; the autoclave is evacuated and 700 g. (1.980 moles) of pure $C_2F_4I_2$ are introduced by suction. The agitator is started and 1010 g. of liquid anhydrous hydrogen fluoride are supplied and then, while maintaining agitation, the autoclave is heated by means of a circulating oil jacket until an interior temperature of 150° C. with 2 hours is reached. It is kept at this temperature under the autogenous pressure of 35 atm. for 2 hours and is then cooled to about 60° C., the products obtained are discharged and washed first with water and then with a 20% aqueous NaOH solution dried and condensed in a glass trap cooled to −30° C.

390 g. of $C_2F_5I$ are thus obtained while in the autoclave 130 g. of $C_2F_4I_2$, 200 g. of $I_2$ and 250 g. of $PbF_2$ are recovered.

The conversion of $C_2F_4I_2$ is 80% while the net yield in $C_2F_5I$ is 100%.

EXAMPLE 9

Into a 4,500-cc. stainless-steel autoclave, provided with a mechanical agitator, 250 g. (0.990 mole) of $PbO_2$ (purity≧95%) are charged and 700 g. (1.980 moles) of $C_2F_4I_2$ and 210 g. of anhydrous liquid HF are drawn in.

Agitation is started and by external heating, the inner temperature is raised to 150° C. within 2 hours; the system is kept at 150° C. under the autogenous pressure of 15 ata. for further 2 hours. The product is then discharged through the usual washing system.

128 g. of pure $C_2F_5I$ are thus obtained while 500 g. of $C_2F_4I_2$, 65 g. of $I_2$ and 250 g. of $PbF_2$ are recovered as a solid residue in the autoclave.

The conversion of $C_2F_4I_2$ is 26.3% while the net yield in $C_2F_5I$ is 100%.

EXAMPLE 10

Into the autoclave described in Examples 8 and 9, 250 g. (0.990 mole) of $PbO_2$ (purity≧95%) is charged; vacuum is applied and 700 g. (1.980 moles) of $C_2F_4I_2$ and 1000 g. of liquid anhydrous HF are drawn in. While agitating, the interior temperature is raised to 125° C. within two hours and the system is kept at 125° C. under the autogenous pressure of 24 ata. for 4 hours.

The autoclave is then discharged as in Examples 8 and 9.

415 g. of pure $C_2F_5I$ and 102 g. of unconverted $C_2F_4I_2$ are obtained while 202 g. of $I_2$ and 248 g. of $PbF_2$ are recovered. The conversion of $C_2F_4I_2$ is 85% while the net yield is 100%.

EXAMPLE 11

Into the autoclave described in Example 8–10, 250 g. (0.990 mole) of $PbO_2$ (purity≧95%) are charged, vacuum is applied and 700 g. (1.980 moles) of $C_2F_4I_2$ and 1000 g. of liquid anhydrous HF are drawn in. While agitating, the temperature is raised to about 80° C. within one hour and the system is maintained at 80° C. under the autogenous pressure of 6 ata. for 6 hours and the autoclave is then discharged as described in the Examples 8–10.

160 g. of $C_2F_5I$ are obtained and 460 g. of $C_2F_4I_2$, 80 g. of $I_2$ and 250 g. of $PbF_2$ are recovered. The conversion of $C_2F_4I_2$ was 32.8% and the net yield of $C_2F_5I$ was 100%.

EXAMPLE 12

In the autoclave described in Examples 8–11, 250 g. (0.990 mole) of purified $PbO_2$ (purity≧90%) are charged, vacuum is applied and 700 g. (1.980 moles) of $C_2F_4I_2$ and 1000 g. of liquid anhydrous HF are drawn in. While agitating, the interior temperature is raised to 125° C. within two hours and the whole is kept at 125° C. under 24 ata. for 4 hours and the autoclave is then discharged as described in the Examples 8–11.

398 g. of $C_2F_5I$ are obtained and 121 g. of unconverted $C_2F_4I_2$, 200 g. of $I_2$ and 248 g. of $PbF_2$ are recovered. The conversion of $C_2F_4I_2$ was 81.7% while the net yield in $C_2F_5I$ was 100%.

EXAMPLE 13

Into the autoclave described in Examples 8–12, 250 g. (0.940 mole) of purified $PbO_2$ (purity≧90%) are charged, vacuum is applied and 300 g. (1.410 moles) of $C_2F_4I_2$ and 1000 g. of liquid anhydrous HF are drawn in. While agitating, the interior temperature is raised to 125° C. within 1 hour and 50 minutes and the autoclave is kept at 125° C. under the autogenous pressure of 24 ata. for 4 hours, and is then discharged.

325 g. of $C_2F_5I$ are obtained and 31 g. of $C_2F_4I_2$, 161 g. of $I_2$ and 242 g. of $PbF_2$ are recovered. The conversion of $C_2F_4I_2$ is 93.6% while the net yield of $C_2F_5I$ is 100%.

EXAMPLE 14

Into the autoclave described in Examples 8–13, 500 g. (1.980 moles) of $PbO_2$ (purity≧95%) are charged, vacuum is applied and 700 g. of $C_2F_4I_2$ (1.980 moles) and 1000 g. of liquid anhydrous HF are drawn in. While agitating, the interior temperature is raised to 150° C. within two hours and is kept at this value for 1 hour and 30 minutes under an autogenous pressure of 26.5 ata.

At the end of this period the autoclave is cooled and 460 g. of pure $C_2F_5I$ are discharged; 100 g. of gaseous $C_2F_4$ are then charged again and the temperature is raised again to 160° C. for 1 hour and 30 minutes while agitating continuously, reaching the pressure of 21 ata. The autoclave is cooled again and 195 g. of $C_2F_5I$ and 3 liters of unconverted $C_2F_4$ are discharged and from the autoclave 68 g. of $C_2F_4I_2$ and 468 g. of $PbF_2$ and 110 g. of $I_2$ are recovered.

EXAMPLE 15

Into the autoclave described in Examples 8–13, 250 g. of $PbO_2$ (purity≧95%) are charged, vacuum is applied and 700 g. (1.980 moles) of $C_2F_4I_2$ and 1020 g. of liquid anhydrous HF are drawn in. The temperature is raised to 150° C. while agitating for 2 hours and the reaction system is kept at 150° C. under 26 ata. for 1 hour and 30 minutes.

The autoclave is then cooled and 418 g. of $C_2F_5I$ and 50 g. of unconverted $C_2F_4I_2$ are discharged. 100 g. of gaseous $C_2F_4$ are then charged in the autoclave still containing the solid products $PbF_2$ and $I_2$; the temperature is raised again to 150° C. for 30 minutes and the gaseous products are discharged again thus obtaining 40 g. of unconverted $C_2F_4$, 5 g. of $C_2F_5I$ and 204 g. of $C_2F_4I_2$. The solid product, comprising $PbF_2$ and a portion of iodine, accounted for 352 g.

We claim:

1. A process for the production of iodopentafluoroethane, comprising the step of reacting $C_2F_4I_2$ with HF and $PbO_2$ at a temperature between substantially 25° C. and 200° C. and at a pressure between 5 atmospheres absolute and 50 atmospheres absolute, the molar ratio $HF/C_2F_4I_2$ being between 2 and 50 and the molar ratio $PbO_2/C_2F_4I_2$ being between 0.5 and 2.

2. The process defined in claim 1, which further comprises the step of reacting tetrafluoroethylene with molecular iodine to form di-iodotrafluoroethane prior to the reaction thereof with said $PbO_2$ and said HF.

3. The process defined in claim 2 wherein the molar ratio $HF/C_2F_4I_2$ is between 10 and 30.

4. The process defined in claim 2 wheren the molar ratio $PbO_2/C_2F_4I_2$ ranges between 0.5 and 1, inclusively.

5. The process defined in claim 2 wherein said temperature is in the range of 80° C. to 160° C.

6. The process defined in claim 2 wherein iodine is produced in the reaction between $C_2F_4I_2$, HF and $PbO_2$, further comprising the step of adding thereto sufficient tetrafluoroethylene to consume the iodine formed in the reaction and convert the same to additional quantities of $C_2F_4I_2$ capable of reacting in situ with said HF and said $PbO_2$.

7. The process defined in claim 1 wherein the reaction is carried out in an autoclave, further comprising the step of excluding air from said autoclave prior to reacting said $C_2F_4I_2$, said HF and said $PbO_2$ therein.

8. The process defined in claim 1 wherein said reaction is carried out in an autoclave, further comprising the steps of cooling said autoclave upon conclusion of said reaction, recovering a condensible gas from said autoclave consisting predominantly of $C_2F_5I$, and obtaining a solid residue from said autoclave consisting predominantly of $PbF_2$ and molecular iodine, and reacting the molecular iodine of said residue with tetrafluoroethylene to form di-iodotetrafluoroethane for further reaction with HF and $PbO_2$.

9. The process defined in claim 8 wherein the molecular iodine of said residue is separated from said $PbF_2$ prior to reacting with tetrafluoroethylene.

10. The process defined in claim 8 wherein the molecular iodine of said residue is reacted with said tetrafluoroethylene in situ in said autoclave.

References Cited

UNITED STATES PATENTS

| | | | |
|---|---|---|---|
| 2,466,189 | 4/1949 | Waalkes | 260—653.6 |
| 3,133,125 | 5/1964 | Drysdale et al. | 260—653.7 |
| 3,140,320 | 7/1964 | Weinmayr | 260—653.6 |

DANIEL D. HORWITZ, Primary Examiner

U.S. Cl. X.R.

260—653